United States Patent
Hoki

(10) Patent No.: US 8,102,421 B2
(45) Date of Patent: Jan. 24, 2012

(54) IMAGE PROCESSING DEVICE FOR VEHICLE, IMAGE PROCESSING METHOD OF DETECTING THREE-DIMENSIONAL OBJECT, AND IMAGE PROCESSING PROGRAM

(75) Inventor: Kenta Hoki, Oobu (JP)

(73) Assignee: Denso Corporation, Kariya (JP)

( * ) Notice: Subject to any disclaimer, the term of this patent is extended or adjusted under 35 U.S.C. 154(b) by 467 days.

(21) Appl. No.: 12/386,160

(22) Filed: Apr. 14, 2009

(65) Prior Publication Data
US 2009/0262188 A1   Oct. 22, 2009

(30) Foreign Application Priority Data
Apr. 18, 2008 (JP) .................................. 2008-108851

(51) Int. Cl.
*H04N 13/00* (2006.01)
(52) U.S. Cl. ........................... 348/118; 348/42; 348/113
(58) Field of Classification Search ................ 348/42, 348/46, 48, 113–116, 118
See application file for complete search history.

(56) References Cited

U.S. PATENT DOCUMENTS

| 6,807,287 | B1* | 10/2004 | Hermans | 382/104 |
| 6,823,261 | B2* | 11/2004 | Sekiguchi | 701/301 |
| 7,038,577 | B2* | 5/2006 | Pawlicki et al. | 701/301 |
| 7,889,193 | B2* | 2/2011 | Platonov et al. | 345/419 |
| 2002/0134151 | A1* | 9/2002 | Naruoka et al. | 382/104 |
| 2007/0274566 | A1* | 11/2007 | Fujimoto | 382/103 |
| 2009/0169052 | A1* | 7/2009 | Seki et al. | 382/103 |
| 2009/0257659 | A1* | 10/2009 | Suzuki et al. | 382/199 |

FOREIGN PATENT DOCUMENTS

| JP | 06-124340 | 5/1994 |
| JP | 10-222679 | 8/1998 |
| JP | 2003-308599 | 10/2003 |

OTHER PUBLICATIONS

Notice of Reasons for Refusal dated Apr. 13, 2010 in Japanese Application No. 2008-108851 with English translation thereof.

* cited by examiner

Primary Examiner — Patrice Winder
(74) Attorney, Agent, or Firm — Harness, Dickey & Pierce, PLC

(57) ABSTRACT

An image processing device determines, cuts and extracts a processing area from an image data monitored by a camera mounted onto a driver's vehicle based on a distance between a front target object and a driver's vehicle, a horizontal position of the driver's vehicle, and a strength of a radar wave transmitted from a radar device and then reflected by objects in front of the driver's vehicle. The radar device is mounted to the driver's vehicle and transmits the radar wave to the front area of the driver's vehicle. The image processing device extracts vertical edges and horizontal edges from the image data in the processing area, and subtracts the horizontal edge values from the vertical edge values, and finally detects whether or not the front target object is a three-dimensional object based on the calculated result of the subtraction of the edges.

11 Claims, 10 Drawing Sheets

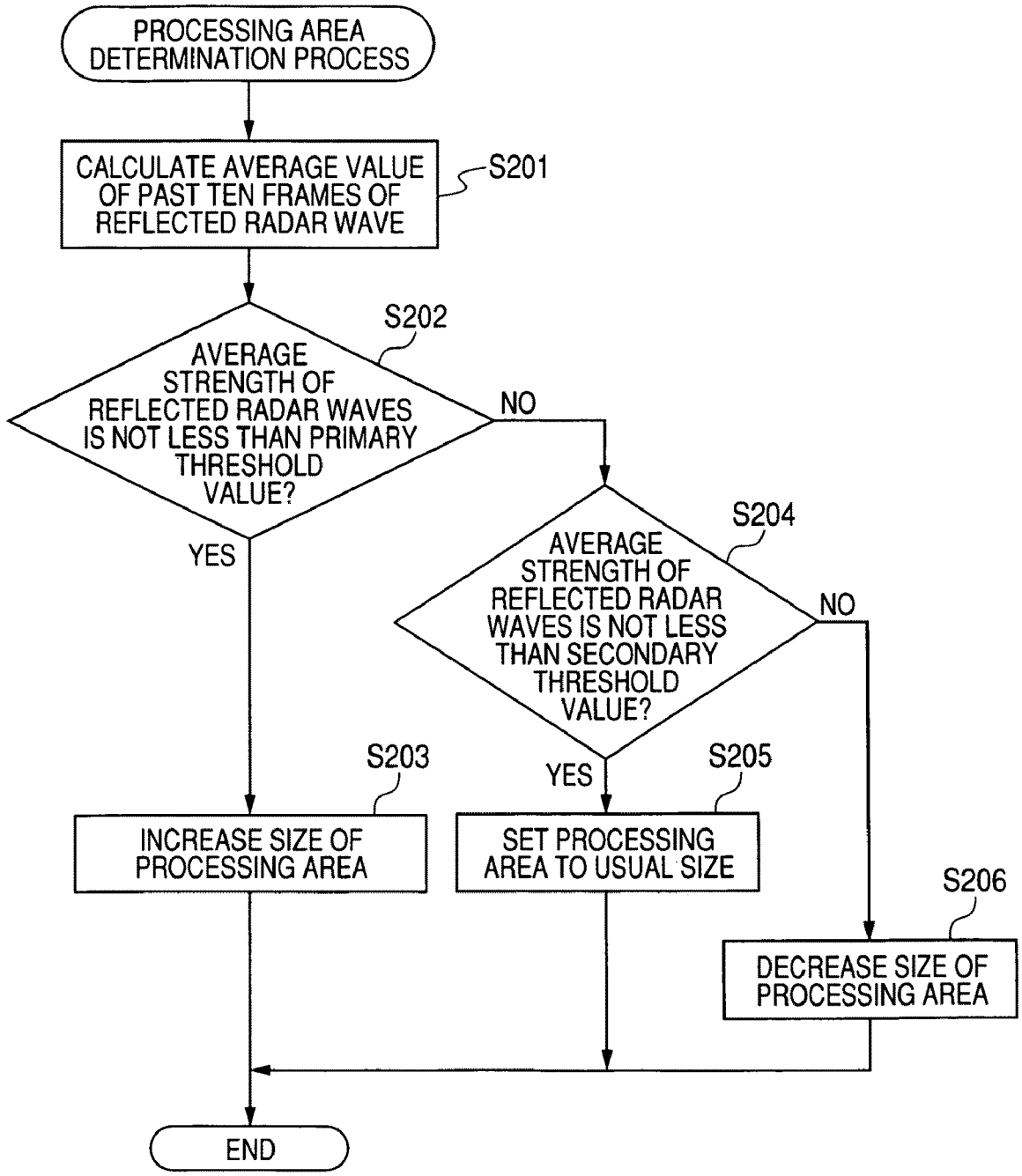

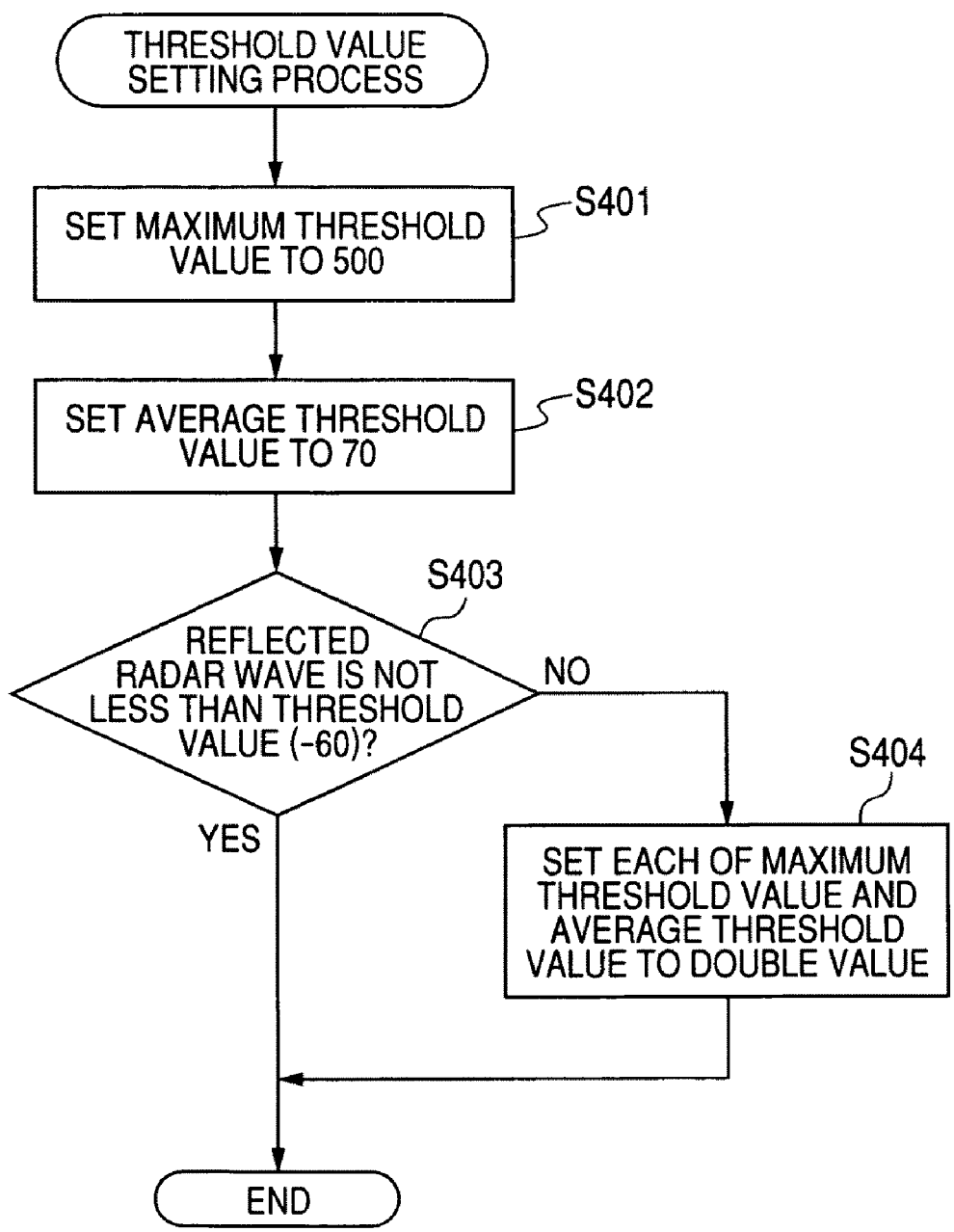

IMAGE PROCESSING DEVICE FOR VEHICLE, IMAGE PROCESSING METHOD OF DETECTING THREE-DIMENSIONAL OBJECT, AND IMAGE PROCESSING PROGRAM

CROSS-REFERENCE TO RELATED APPLICATION

This application is related to and claims priority from Japanese Patent Application No. 2008-108851 filed on Apr. 18, 2008, the contents of which are hereby incorporated by reference.

BACKGROUND OF THE INVENTION

1. Field of the Invention

The present invention relates to an image processing device, a method, and an image processing program to detect a three-dimensional front object as a target to be detected that exists in a front area of the driver's vehicle based on image data monitored in a front area of the driver's vehicle.

2. Description of the Related Art

Recently, various types of conventional detecting techniques have been proposed to detect one or more obstacles that exist in front of a driver's vehicle using an on-vehicle camera. For example, Japanese patent laid open publication No. JP H10-222679 has disclosed an image processing device for vehicles. The conventional image processing device is capable of monitoring the front area at different timings and obtaining front image data having front objects. The conventional image processing device then determines whether a target obstacle is a two-dimensional object or a three-dimensional object based on the monitored image data at different timings. In a concrete example, the conventional image processing device monitors the front target object at different timings T0 and T1 using an on-vehicle camera, and makes image data. The conventional image processing device further detects and uses other vehicle data such as a vehicle speed using a vehicle behavior detecting device. The conventional image processing device calculates a predicted position of the vehicle at timing T1 based on the monitored image data at timing T0 and the running condition of the vehicle under the predictive condition in which the front object is a two-dimensional object. The conventional image processing device then obtains the predicted image data at timing T1. The conventional image processing device compares the monitored image data obtained at timing T1 with the predicted image data at timing T1. When the comparison result indicates that the actual images data at timing T1 and the predicted image data at timing T1 are the same, the conventional image processing device detects that the front object is a two-dimensional object. On the other hand, when the comparison result indicates that the actual images data at timing T1 and the predicted image data at timing T1 are not the same, the conventional image processing device detects that the front object is a three-dimensional object.

However, because the conventional image processing device disclosed by the conventional technique JP H10-222679 uses the image data monitored at different timings and the predicted image, when the time interval between the different monitoring timings T0 and T1 is short, it becomes difficult to correctly detect the front object because the target object, in particular, a distant object becomes small in change in the monitored image data. On the other hand, when the time interval between the monitoring timings T0 and T1 becomes long, the magnitude in change of a near object becomes extremely large, and this imposes a heavy load on the conventional image processing device. As a result, this makes it difficult to obtain a correct detection (or judgment) result at high speed.

SUMMARY OF THE INVENTION

It is an object of the present invention to provide an image processing device for a vehicle capable of correctly detecting a front target object as a three-dimensional object that exists in a front area, that is, in front of the driver's vehicle regardless of a distance between the driver's vehicle and the front target object. Another object of the present invention is to provide an image processing method of detecting a front target object and an image processing program performed by the image processing device.

To achieve the above purposes, the present invention provides an image processing device to be mounted into a driver's vehicle. The image processing device has an image obtaining means, a position information obtaining means, a processing area determining means, and a judgment means. The image obtaining means receives monitored image data of a front area having one or more front objects that exist in the front area of the driver's vehicle. The position information obtaining means receives position information of the front objects using a wave transmitted toward the front area in front of the driver's vehicle and then reflected by the front objects. The processing area determining means determines a processing area including the front target object in the front objects in the monitored image data based on the position information. The judgment means detects whether or not the front target object is a three-dimensional object based on edges detected in the image data in the processing area determined by the processing area determining means.

Because the image processing device according to the present invention detects or judges the front target object based on the edges that are detected from the monitored image data, it is possible to detect the front target object regardless of the distance between the driver's vehicle and the front target object. In particular, the image processing device according to the present invention does not detect the possibility whether or not the front target object is a three-dimensional object based on the edges which are directly and simply obtained from the monitored image data. That is, the image processing device according to the present invention firstly determines or selecting the processing area in which the front target object exists, secondarily detects edges in the determined processing area, and finally determines the possibility whether or not the front target object is a three-dimensional object based on the edges obtained from the determined processing area.

It is therefore possible for the data processing apparatus according to the present invention to have high detection (or judgment) accuracy and to reduce the processing load of the image processing device.

BRIEF DESCRIPTION OF THE DRAWINGS

A preferred, non-limiting embodiment of the present invention will be described by way of example with reference to the accompanying drawings, in which:

FIG. 3 is a flow chart showing a processing area determination process of setting the size of the processing area performed by the image processing device according to the embodiment of the present invention;

FIG. 11 is a flow chart showing a modification of the process of setting the threshold value in order to obtain a maximum threshold value and an average threshold value performed by the image processing device according to the embodiment of the present invention.

DETAILED DESCRIPTION OF THE PREFERRED EMBODIMENTS

Figure 1:
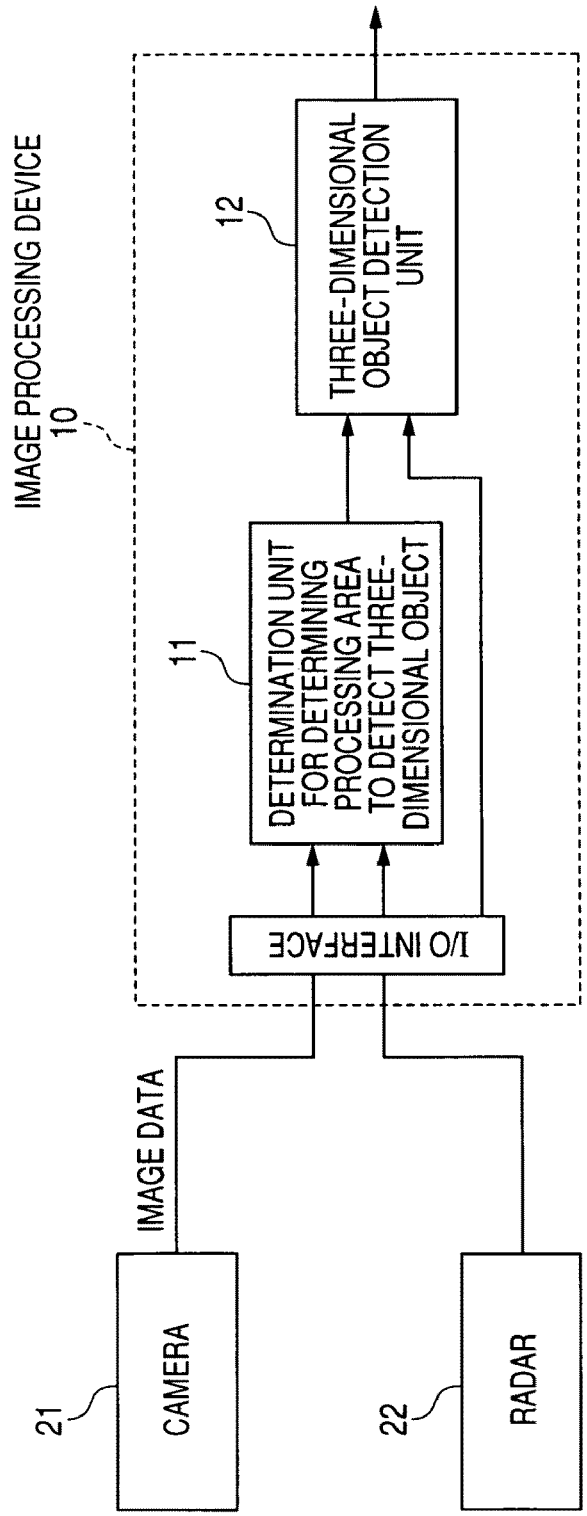
FIG. 1 is a block diagram showing a structure of an image processing device mounted on a vehicle according to an embodiment of the present invention.

Hereinafter, various embodiments of the present invention will be described with reference to the accompanying drawings. In the following description of the various embodiments, like reference characters or numerals designate like or equivalent component parts throughout the several diagrams.

Embodiment

A description will be given of the image processing device 10 for vehicles according to the embodiment of the present invention with reference to FIG. 1 to FIG. 11.
(Entire Structure of the Image Processing Device 10)

FIG. 1 is a block diagram showing a structure of the image processing device 10 mounted onto a driver's vehicle according to an embodiment of the present invention.

The image processing device 10 is an electronic control device equipped with a central processing unit (CPU), a read only memory (ROM), a random access memory (RAM), an input and output interface (I/O interface), and other components. The image processing device 10 (as a processing area setting means and a judgment means) receives image data transferred from an on-vehicle camera 21 (as an image obtaining means, and hereinafter, will also be referred to as the "camera" for short) mounted to a vehicle and various vehicle information obtained from a radar wave (or a wave for short) of a millimeter wave radar 22 (as a position information obtaining means, hereinafter, will also be referred to as the "radar" for short).

The image processing device 10 obtains the various information based on the wave which is transmitted by the radar 22 toward the front area (ahead of the driver's vehicle) and then reflected by one or more front objects as two-dimensional objects or three-dimensional objects. Those front objects exist in the front area which is in front of the driver's vehicle (or the own vehicle).

The image processing device 10 then detects the front objects (ahead of the driver's vehicle) based on the received data and information. This image processing device 10 is mounted to the driver's vehicle. The camera 21 is located in the inside of the compartment of the driver's vehicle, for example, at the hidden side of the room mirror of the driver's vehicle in order to monitor the front area in front of the driver's vehicle. The camera 21 is equipped with an amplifier unit and an analogue to digital (A/D) converter in addition to a CD image sensor or a CMOS image sensor.

When the camera 21 monitors the image of the area in front of the driver's vehicle, the amplifier unit receives the detected image data in analogue form, and amplifies the detected image data with a predetermined gain, and the A/D converter converts the amplified image data in analogue form to the image data in digital form. The camera 21 outputs the converted image data as image signals (picture values).

The radar 22 transmits a radar wave (or a wave for short) in a millimeter wave band toward the front area in front of the driver's vehicle through an antenna (not shown). The radar wave in the millimeter-wave band is made by frequency demodulation. The radar wave is then reflected by one or more front objects such as obstacles. The radar 22 receives the reflected radar wave. The radar 22 then detects various information of the front objects that exist in front of the driver's vehicle based on the received radar wave. For example, as the information of one front target object, there are the distance of the front object measured from the driver's vehicle, the horizontal position of the front object to the driver's vehicle, and the intensity of the reflected radar wave. The radar 22 detects one or more front objects which exist in a horizontal range within a predetermined angle in front of the driver's vehicle.

The image processing device 10 according to the embodiment of the present invention performs programs that are stored in advance in the ROM or RAM, or both the memories. The image processing device 10 serves as a determination unit 11 and a three-dimensional object detection unit 12 shown in FIG. 1.

The determination unit 11 determines the processing area, in which the front objects exist, in the image data monitored by the camera 21 based on the information such as the distance between the front objects and the driver's vehicle, the horizontal position, and the strength of the reflected wave detected by the radar 22. The determination unit 11 cuts and extracts the determined processing area from the monitored image data, and transfers the determined processing area to the three-dimensional object detection unit 12.

The three-dimensional object detection unit 12 receives the image data transferred from the determination unit 11, and detects or judges whether or not the front target object is a three-dimensional object (or a solid object) based on edges detected from the received image data in the processing area determined by and transferred from the determination unit 11. The three-dimensional detection unit 12 outputs the detection results to another on-vehicle device such as a control device to perform a pre-crash safety system.

(Judgment Process)

Next, a description will be given of the three dimensional object detection process to detect a three dimensional object with reference to FIG. 2.

Figure 2:
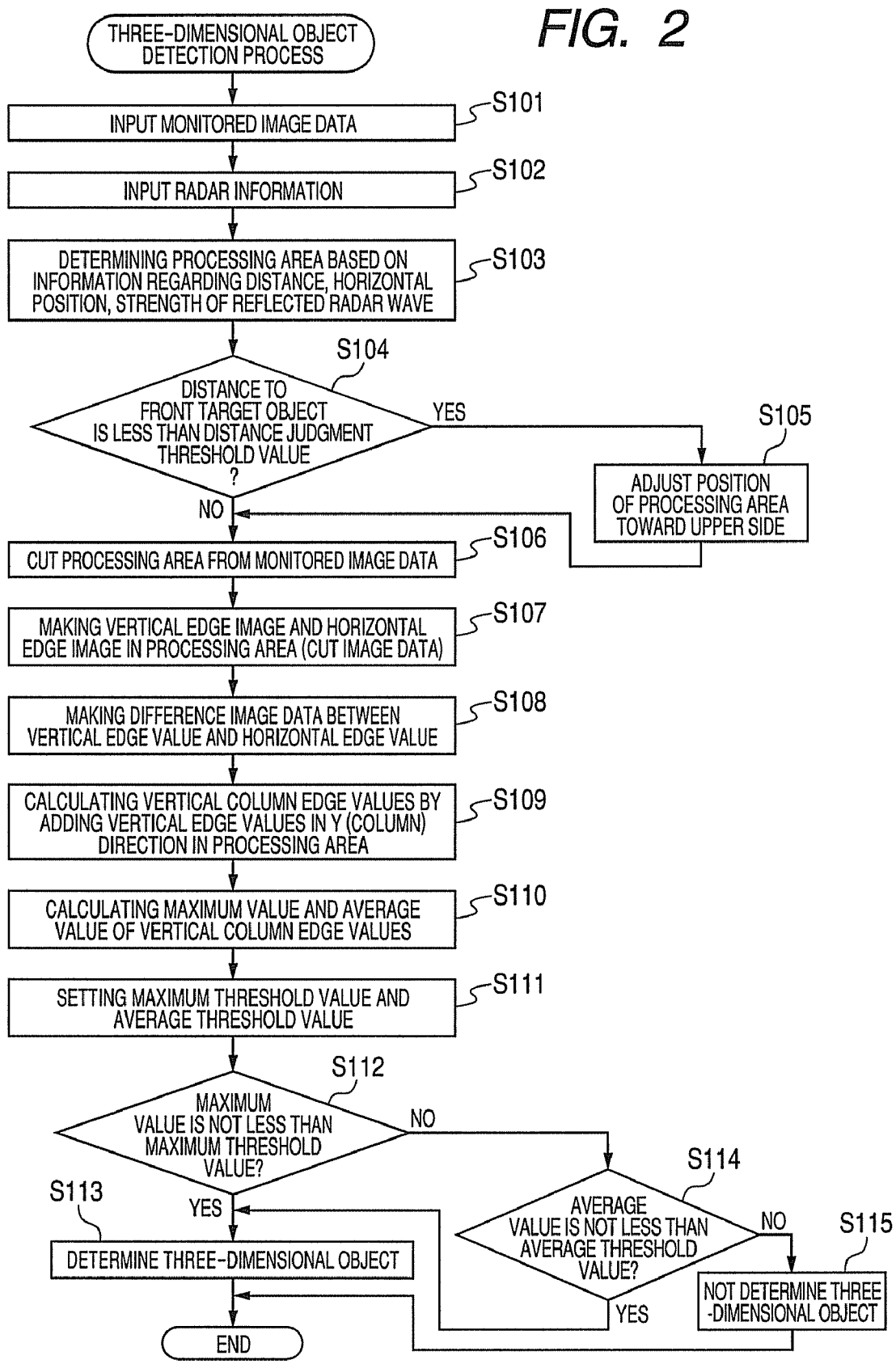
FIG. 2 is a flow chart showing a three-dimensional object detection process of detecting a three-dimensional object as the front target object performed by the image processing device according to the embodiment of the present invention.

FIG. 2 is a flow chart showing the three-dimensional object detection process of determining a three dimensional object as a front target object performed by the image processing device 10 according to the embodiment of the present invention.

The image processing device 10 executes the judgment process every predetermined time (for example, every 100 msec).

When starting the process of detecting whether the front target object in front of the driver's vehicle is a three-dimensional object, the image processing device 10 inputs the image data monitored by and transferred from the camera 21 (step S101).

In step S102, the image processing device 10 receives the information transferred from the radar 22. The information includes the distance to the front target object detected from the driver's vehicle, the horizontal position of the driver's vehicle, and the intensity of the radar wave (or the wave for short) reflected by the front object.

In step S103, the image processing device 10 calculates the position of the front target object in the image data based on the information regarding the distance and the horizontal position of the front target object obtained in step S102. The image processing device 10 then determines the optimum area, in which the front target object exists, as the processing area.

The image processing device 10 according to the embodiment of the present invention changes the size of the processing area based on the strength of the reflected radar wave obtained in step S102. However, it is also possible to use a constant sized area as the processing area.

FIG. 3 is a flow chart showing the processing area determination process of setting the size of the processing area. When initiating the processing area determination process of setting the size of the processing area, the image processing device 10 calculates the average strength value of the reflected radar waves in the past ten frames.

In step S202, the image processing device 10 determines whether or not the average strength value of the reflected radar waves calculated in step S201 is not less than a predetermined threshold value.

Figure 4A:
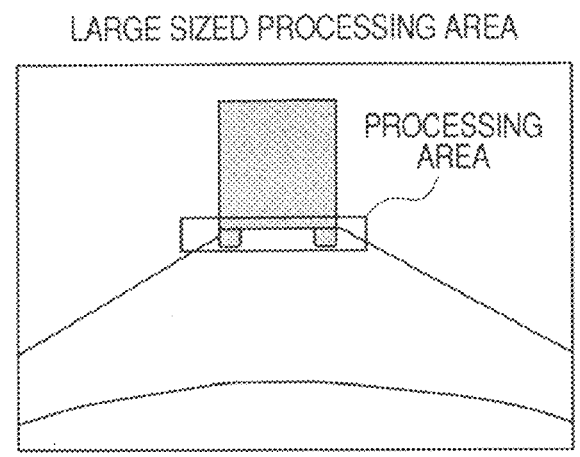
FIG. 4A, FIG. 4B, and FIG. 4C are diagrams showing a large sized processing area, an usual sized (or normal sized) processing area, and a small sized processing area, respectively, which are selected according to an average intensity of reflected radar waves by the image processing device according to the embodiment of the present invention.
Figure 4B:
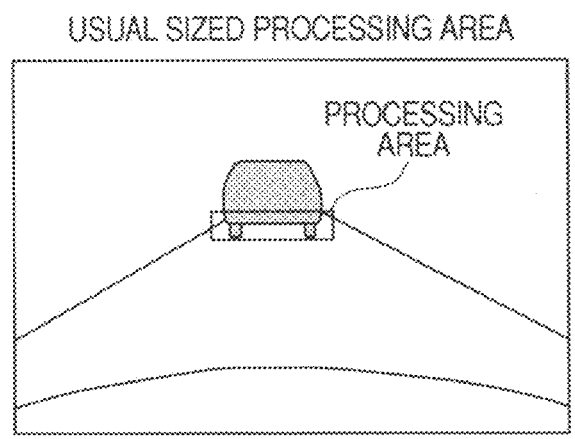
Figure 4C:
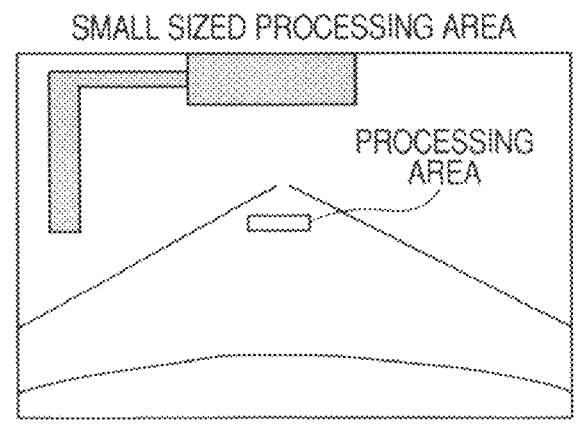

FIG. 4A, FIG. 4B, and FIG. 4C are diagrams showing a large sized processing area, an usual sized (or normal sized) processing area, and a small sized processing area, respectively, which are selected according to the average strength of the reflected radar wave by the image processing device according to the embodiment of the present invention;

When the judgment result indicates that the average strength of the reflected radar waves is not less than the predetermined primary threshold value ("YES" in step S202), the operation flow goes to step S203. In step S203, the image processing device 10 selects the large processing area shown in FIG. 4A. The large processing area shown in FIG. 4A is larger in area or size than the usual sized (or normal sized) processing area shown in FIG. 4B. The image processing device 10 then completes the operation of setting the size of the processing area.

On the other hand, when the judgment result indicates that the average strength of the reflected radar waves is less than the predetermined primary threshold value ("NO" in step S202), the operation flow goes to step S204. In step S204, the image processing device 10 detects whether or not the average strength of the reflected radar waves is not less than a secondary predetermined threshold value. In particular, it is set so that the predetermined secondary threshold value is less than the predetermined primary threshold value.

When the judgment result indicates that the average strength of the reflected radar waves is not less than the predetermined secondary threshold value ("YES" in step S204), the operation flow progresses to step S205. The image processing device 10 sets the usual sized (or normal sized) processing area as the processing area (step S205).

On the other hand, when the judgment result indicates that the average strength of the reflected radar waves is less than the predetermined secondary threshold value ("NO" in step S204), the operation flow goes to step S206. In step S206, the image processing device 10 selects the small processing area (shown in FIG. 4C) as the processing area. The small sized processing area shown in FIG. 4C is smaller in area than the usual sized (or normal sized) processing area shown in FIG. 4B. The image processing device 10 then completes the operation of setting the size of the processing area.

In the process of setting the processing area, the image processing device 10 sets the processing area to a large sized processing area according to increasing the average strength of the reflected radar waves, as shown in FIG. 4A to FIG. 4C.

Although it is also possible to set the processing area based on the strength of the latest reflected radar wave instead of using the average strength of the reflected radar waves, it is preferable to use the average strength of the reflected radar waves because the average strength of the reflected radar waves more suppresses the influence of the variation of detection values when compared with using the latest reflected radar wave.

Returning to the three-dimensional object detection process shown in FIG. 2, the image processing device 10 determines whether or not the distance to the front target object detected from the driver's vehicle is less than a predetermined distance-judgment threshold value. That is, it is determined or judged whether the front target object is near the driver's vehicle.

When the judgment result indicates that the distance to the front target object is less than the distance-judgment threshold value ("YES" in step S104), the operation flow goes to step S105. In step S105, the image processing device 10 performs the adjustment process to shift the position of the processing area in the monitored image data determined in step S103 toward the upper side of the monitored image data by a predetermined compensation value. This predetermined compensation value is set in advance. The operation flow then progresses to step S106.

Figure 5A:
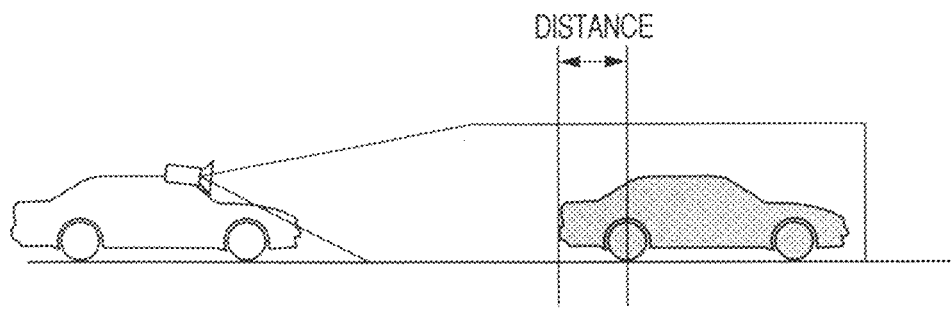
FIG. 5A and FIG. 5B are diagrams showing a process of adjusting the position of the processing area toward the upper side in the image data performed by the image processing device according to the embodiment of the present invention when the distance to the front target object from the driver's vehicle is short.
Figure 5B:
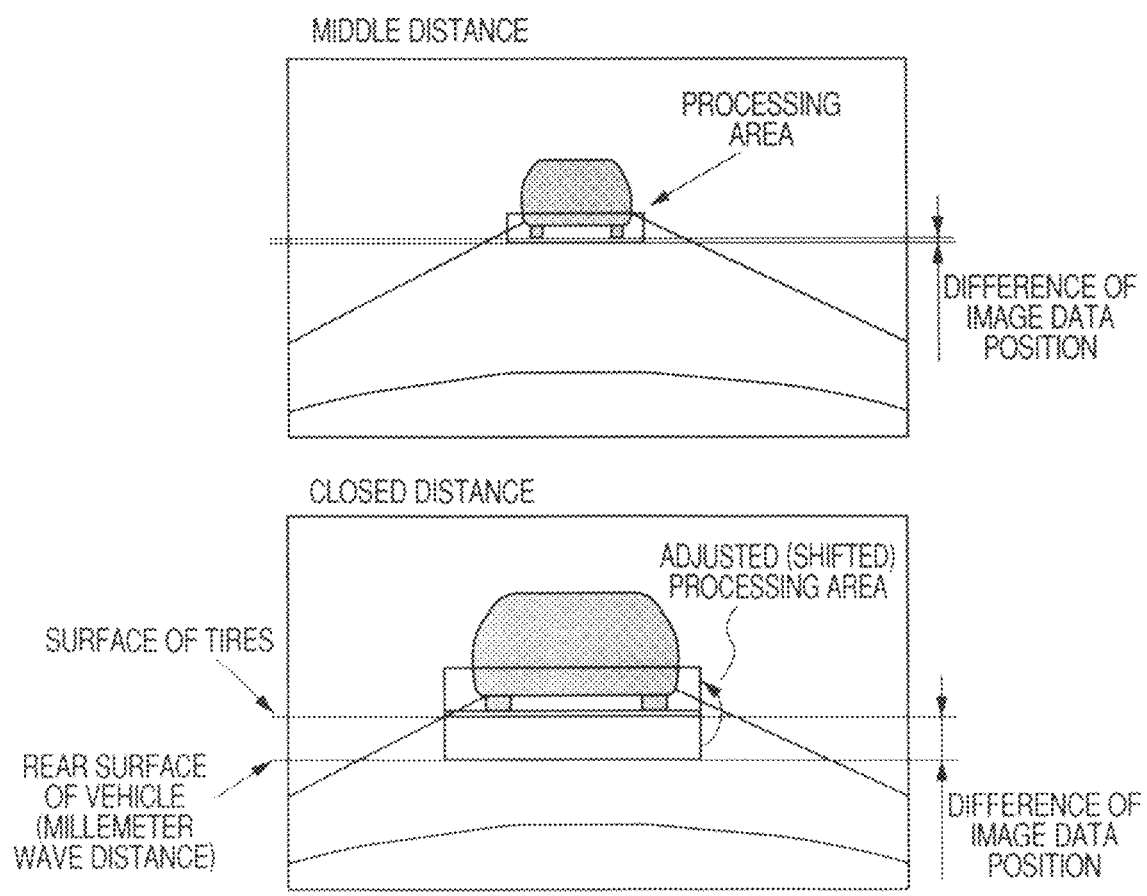

FIG. 5A and FIG. 5B are diagrams showing a process of adjusting the position of the processing area toward the upper side in the monitored image data performed by the image processing device according to the embodiment of the present invention when the distance to the front vehicle (as the front target object) from the driver's vehicle is short.

That is, when the front target object is a vehicle (also referred to as the "front vehicle") that runs in front of the driver's vehicle as shown in FIG. 5A, there is a difference between following distances d1 and d2:

The distance d1, which is actually detected by the radar 22, between the rear side of the front vehicle from the driver's vehicle; and The distance d2 between a surface of the tires of the front vehicle which actually contact with the surface of the road from the driver's vehicle.

When the processing area is determined or selected based only on the distance d1 detected from the driver's vehicle to the rear side of the front vehicle, the processing area has an unnecessary space-area over the surface of the road on which the front vehicle runs. This decreases the ratio of the size of the front vehicle (as the front target object) to the processing area. As shown in FIG. 5B, the more the front vehicle is close in distance to the driver's vehicle, the more this ratio is remarkably decreased. This phenomenon can also be applied to the case of oncoming vehicles that come toward the driver's vehicle.

Considering from such a viewpoint, when the distance to the target vehicle (as the front vehicle) from the driver's vehicle is short, the image processing device 10 shifts the current processing area toward the upper side in the monitored image data so that the distance from the driver's vehicle to the nearest surface of the target vehicle becomes the distance from the driver's vehicle to the contact position of the tires of the target vehicle's contacted on the road. The nearest surface of the target vehicle may be either at the rear of a preceding vehicle or the front of an oncoming vehicle.

On the other hand, when judgment result indicates that the distance to the front vehicle is less than the predetermined distance-judgment threshold value ("NO" in step S104), the operation flow goes to step S106.

In step S106, the image processing device 10 determines the processing area in the monitored image data. That is, the image processing device 10 cuts and extracts the processing area in the monitored image data in order to determine the processing area. The operation flow progresses to step S107.

Figure 6:
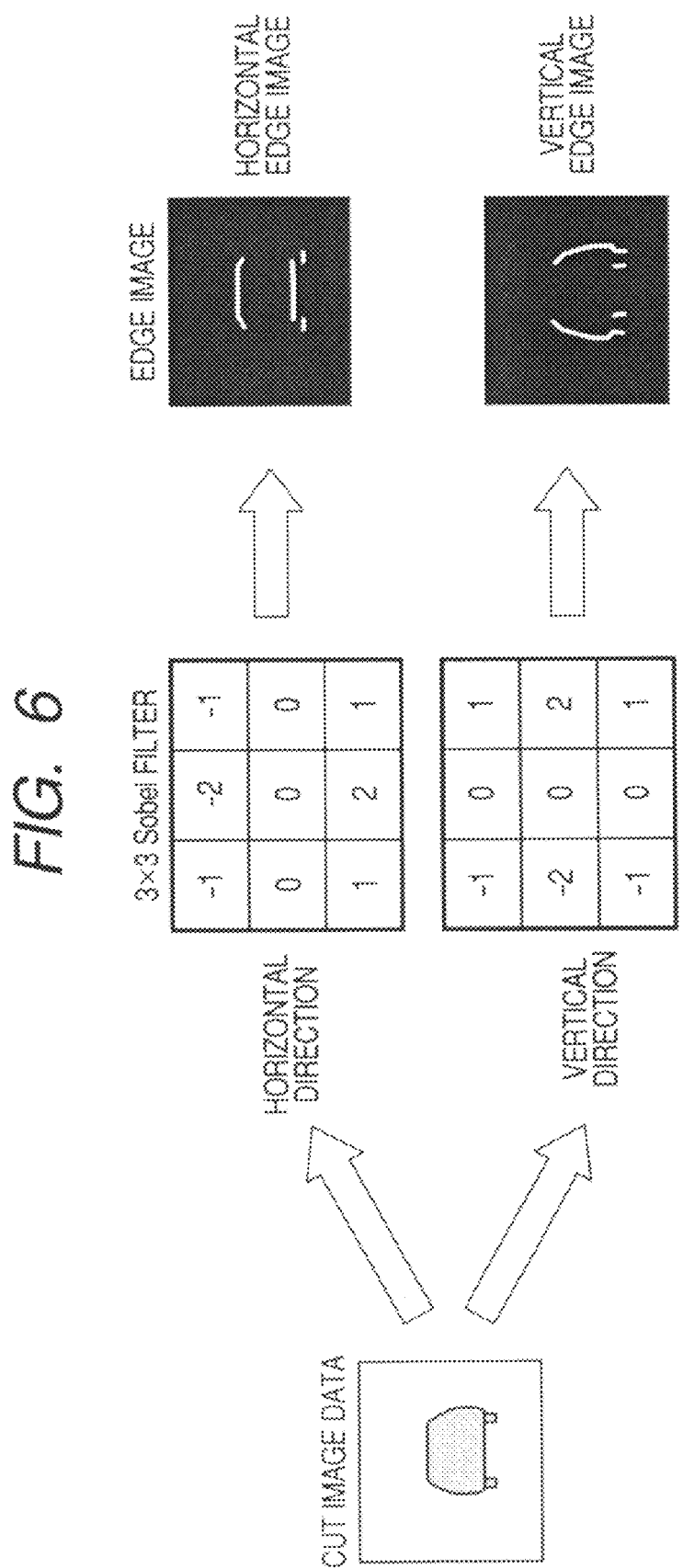
FIG. 6 is a diagram showing the process of forming a vertical edge image and a horizontal edge image performed by the image processing device according to the embodiment of the present invention.

FIG. 6 is a diagram showing the process of making a vertical edge image and a horizontal edge image performed by the image processing device 10 according to the embodiment of the present invention.

In step S107, the image processing device 10 makes the vertical edge image and the horizontal edge image from the processing area as the cut image which has been cut and extracted from the monitored image data in step S106.

In a concrete example, as shown in FIG. 6, the image processing device 10 performs the filtering process using "3×3 Sobel filtering" in the processing area as the cut image data in order to obtain the horizontal edge image having highlighted horizontal edges Similarly, the image processing device 10 performs the filtering process using "3×3 Sobel filtering" in the processing area as the cut image data in order to obtain the vertical edge image having highlighted vertical edges. The operation flow then progresses to step S108.

In step S108, the image processing device 10 performs the process of subtracting each picture element (as the horizontal edge value) in the horizontal edge image obtained in step S107 from a corresponding picture element (as the vertical edge value) in the vertical edge image obtained in step S107 (in order to obtain a post-calculated vertical edge value=vertical edge value−horizontal edge value). This subtracting process removes the vertical edge value in an oblique edge in the processing area by the horizontal edge value in the oblique edge. When the post-calculated vertical edge value becomes a negative value (when the horizontal edge value is larger than the vertical edge value in the oblique edge), the post-calculated edge value is set to zero. The operation flow progresses to step S109.

Figure 7:
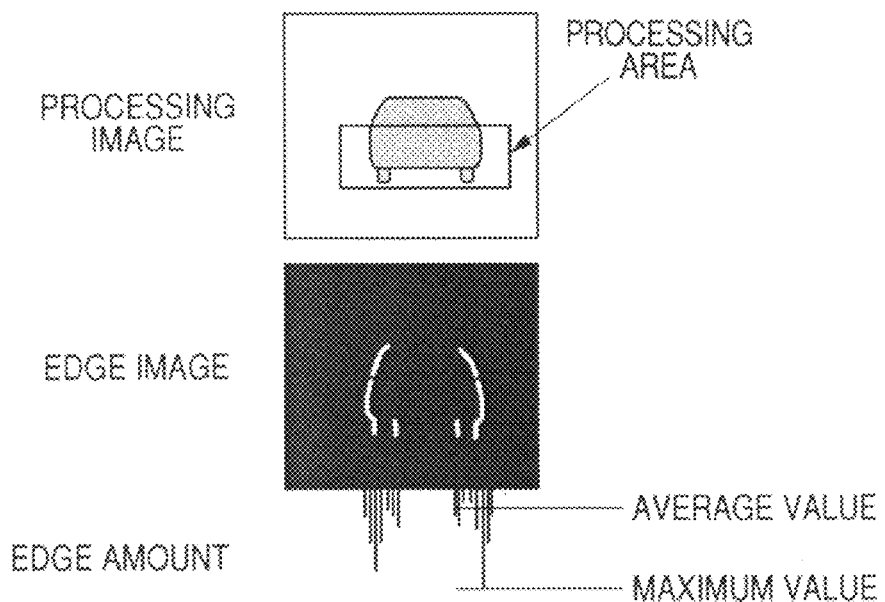
FIG. 7 is a diagram showing a process of calculating a maximum value in vertical column edge values and an average value thereof performed by the image processing device according to the embodiment of the present invention.

FIG. 7 is a diagram showing a process of calculating a maximum value and an average value of the post-calculated vertical edge values in the vertical edge image.

In step S109, as shown in FIG. 7, the image processing device 10 sums up the post-calculated vertical edge value of each picture element (obtained in step S108) in the image data of the processing area per column (as the vertical direction or Y direction) in order to calculate the vertical column edge values (or the sum edge value per column). The operation flow progresses to step S110.

In step S110, the image processing device 10 determines the maximum edge value in the vertical column edge values and the average edge value in the vertical column edge values obtained in step S109. The operation flow progresses to step S111.

In step S111, the image processing device 10 sets the maximum threshold value and the average threshold value to be used in the judgment process in step S112 and step S114. The judgment process at step S112 and S114 will be explained later.

Figure 8A:
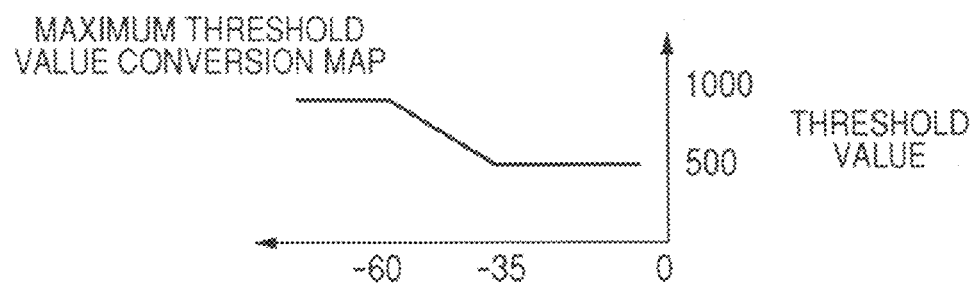
FIG. 8A is a maximum threshold value conversion map showing the relationship between the maximum threshold value and the intensity of a reflected wave.
Figure 8B:
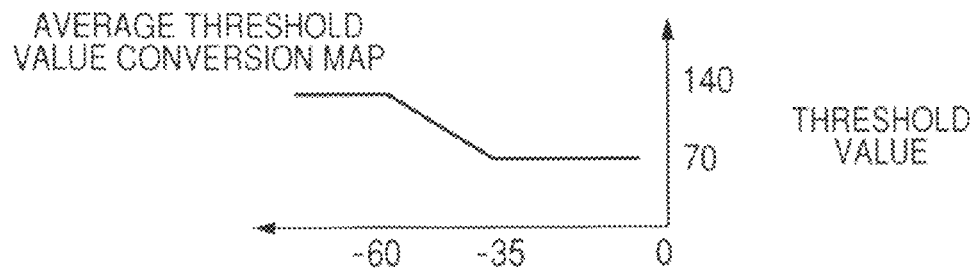
FIG. 8B is a map showing the relationship between the average threshold value and the intensity of a reflected wave.

FIG. 8A is a maximum threshold value conversion map showing the relationship between the maximum threshold value and the intensity of a reflected wave. FIG. 8B is a map showing the relationship between the average threshold value and the intensity of a reflected wave.

The maximum threshold value conversion map shown in FIG. 8A indicates the relationship between the intensity of the reflected radar wave and the maximum threshold value. The average threshold value conversion map shown in FIG. 8B indicates the relationship between the intensity of the reflected radar wave and the average threshold value. In a concrete example, those maps are stored in advance in the memory such as the ROM or the RAM. The image processing device 10 refers to those maps shown in FIG. 8A and FIG. 8B, and obtains the maximum threshold value and the average threshold value corresponding to the intensity of the reflected radar wave obtained in step S102.

When the intensity of the reflected radar waves is weak (for example, not more than −60) in the map shown in FIG. 8A, the maximum threshold value is set to a high maximum threshold value (for example, set to 1000 in the map shown in FIG. 8A). Further, when the intensity of the reflected radar wave is strong (for example, when the intensity of the reflected radar wave is not less than −35), the maximum threshold value is set to a low maximum threshold value (for example, set to 500 in the map shown in FIG. 8A).

On the other hand, when the intensity of the reflected radar wave is weak (for example, not more than −60) in the average threshold value conversion map shown in FIG. 8B, the average threshold value is set to a high average threshold value (for example, set to 140 in the map shown in FIG. 8B). Further, when the intensity of the reflected radar wave is strong (for example, when the intensity of the reflected radar wave is not less than −35), the average threshold value is set to a low average threshold value (for example, set to 70 in the map shown in FIG. 8B). The operation then progresses to step S112.

In step S112, the image processing device 10 judges whether or not the maximum value in the vertical column edge values obtained in step S110 is not less than the predetermined maximum threshold value that is set in step S111.

When the judgment result indicates that the maximum value in the vertical column edge values obtained in step S110 is not less than the predetermined maximum threshold value that is set in step S111 ("YES" in step S112), the operation flow goes to step S113.

In step S113, the image processing device 10 determines or judges that the front target object is a three-dimensional object. The image processing device 10 then completes the three-dimensional object detection process shown in FIG. 2.

On the other hand, when the judgment result indicates that the maximum value in the vertical column edge values obtained in step S110 is less than the predetermined maximum threshold value that is set in step S111 ("NO" in step S112), the operation flow goes to step S114.

In step S114, the image processing device 10 judges whether or not the average value of the vertical column edge values obtained in step S110 is not less than the predetermined average threshold value that is set in step S111.

When the judgment result indicates that the average value in the vertical column edge values obtained in step S110 is not less than the predetermined average threshold value that is set in step S111 ("YES" in step S114), the operation flow goes to step S113. In step S113, the image processing device 10 judges that the front target object is a three-dimensional object. The image processing device 10 then completes the three-dimensional object detection process shown in FIG. 2.

On the other hand, when the judgment result indicates that the average value in the vertical column edge values obtained in step S110 is less than the predetermined average threshold value that is set in step S111 ("NO" in step S114), the operation flow goes to step S115.

In step S115, the image processing device 10 determines or judges that the front target object is not a three-dimensional object. The image processing device 10 then completes the three-dimensional object detection process shown in FIG. 2.

EFFECTS

As described above in detail, the image processing device 10 according to the embodiment of the present invention determines the processing area, in which the front target object to be detected exists, in the image data monitored by the camera 21 based on the information regarding the distance to the front target object from the driver's vehicle, the horizontal position of the front target object, and the radar wave reflected from the front target object and detected by the radar 22. The image processing device 10 determines or judges whether or not the front object is a three-dimensional object based on the edges detected from the image data in the determined processing area.

Because the image processing device 10 determined that the front target object is a three-dimensional object based on the edges detected from the monitored image data, it is possible to obtain the judgment result with high accuracy regardless of the distance from the driver's vehicle to the front target object.

Figure 9:
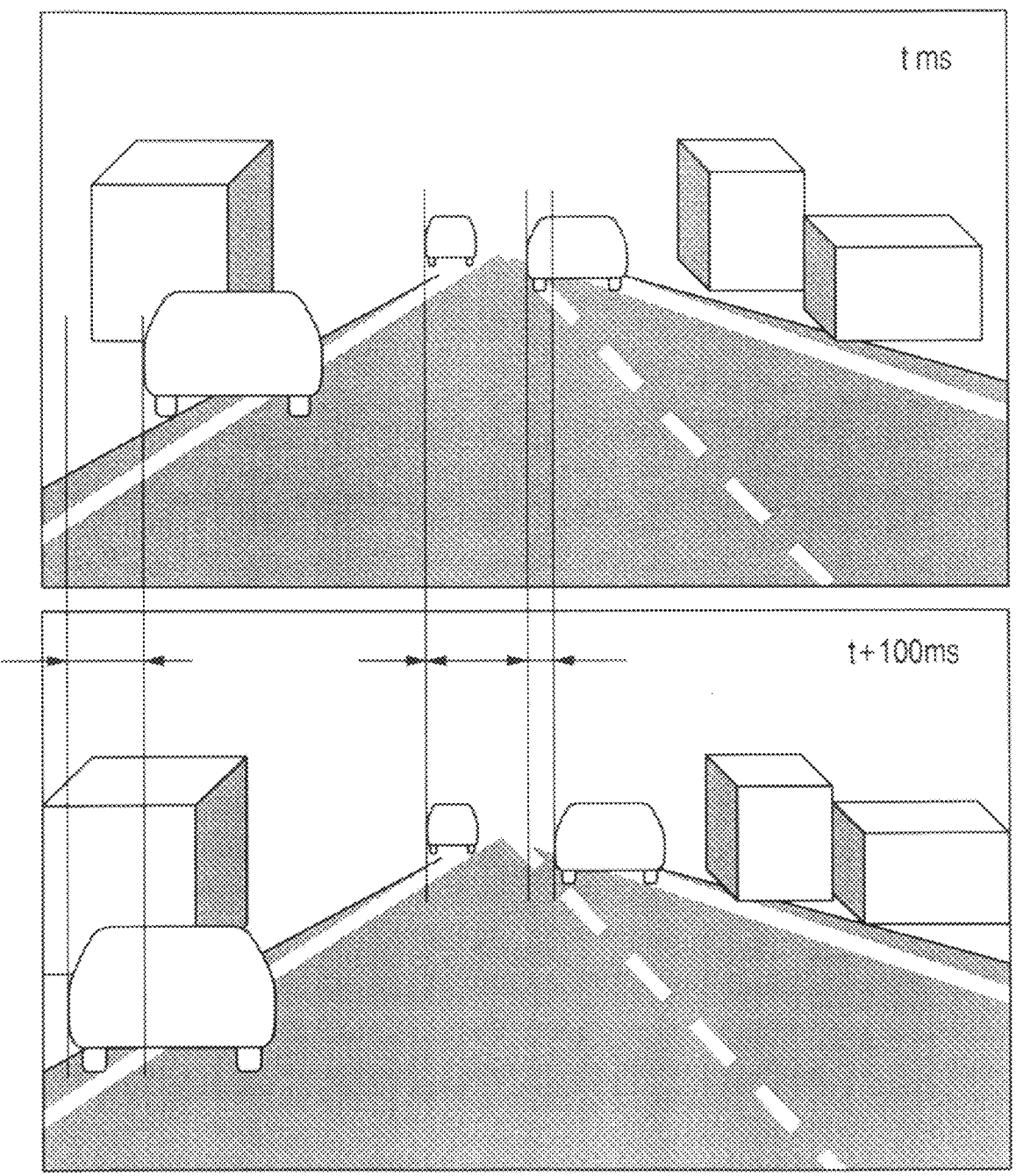
FIG. 9 shows the three-dimensional front target object detection process based on monitored image data obtained at different timings.

FIG. 9 shows the three-dimensional front target object detection process based on the monitored image data obtained at different timings.

That is, as shown in FIG. 9, when the three-dimensional object is detected based on the monitored image data at different timings (for example, t [ms] and t+100 [ms]), the more the distance to the front target object in front of the driver's vehicle is increased, the less the variation (or shifted value) of the monitored image data at different timings is decreased. As a result, this makes it difficult to determine or judge whether or not the front target object is a three-dimensional object with high accuracy. Still further, many additional adjustment processes are needed for the image data such as vehicle behavior adjustment, for example, a pitching process.

On the other hand, because the image processing device 10 according to the present invention performs the judgment process to detect the three-dimensional object based on the edges detected from the unit image data in the processing area extracted from the monitored image data, it is possible to detect a distant object regardless of the distance to the distant object as the front target object with high accuracy. Still further, the judgment process performed by the image processing device 10 can detect a three-dimensional object even if both of the driver's vehicle and the front object stop together.

In particular, the image processing device 10 according to the embodiment of the present invention does not perform the process of detecting the front target object only based on the edges detected from the monitored image data. That is, the image processing device 10 firstly determines the processing area in which the front target object exists from the monitored image data, and secondary perform the process of determining the front target object based on the edges detected from the determined processing area. This can achieve a superior judgment accuracy, and further decrease the processing load of the image processing device 10.

Still further, the image processing device 10 according to the embodiment of the present invention determines or judges whether or not the front target object is a three-dimensional object based on the post-calculated vertical edge values, the vertical edge component in an oblique edge value can be eliminated by the horizontal edge component in this oblique edge value, where the post-calculated vertical edge values are obtained by subtracting the horizontal edge values from the corresponding vertical edge values (see step S107 and S108 shown in FIG. 2). Accordingly, the image processing device 10 can avoid errors caused by the presence of vertical edge components in the oblique edge value (such as a white line on the road) in the image data.

Still further, the image processing device 10 determines or judges that the front target object is a three-dimensional object when at least one of the following conditions (a) and (b) is satisfied (steps S112 to S114):

(a) The maximum value in the vertical column edge values is not less than the predetermined threshold value; and (b) The average value of the vertical column edge values is not less than the average threshold value, where each vertical column edge value is the sum of the vertical edge value of each picture element per column in the image data in the processing area.

The image processing device 10 performing the above determination process can detect the three-dimensional object with high accuracy regardless of the types of the front objects, for example, vehicles and telegraph poles having a relatively small width, buildings and outdoor environments having a relatively large width and complicated structures.

In particular, the image processing device 10 according to the embodiment of the present invention performs the judgment process so that the more the strength of the reflected radar wave is high, the more the values of the maximum threshold value and the average threshold value are decreased (see step S111 and FIG. 8A). This makes it possible to easily determine with high accuracy that the vehicle having a highly strength of the reflected radar wave is a three-dimensional object. This process enhances the judgment accuracy.

In addition, because the image processing device 10 according to the embodiment of the present invention performs the process so that the more the strength of the reflected radar wave is high, the more the size of the processing area is increased (see steps S201 to S206), it is possible for the processing area to reliably include an target object producing strong reflection such as a large-sized vehicle (for example, truck). This process enhances the judgment accuracy.

In addition, because the image processing device 10 adjusts the position of the processing area to be shifted toward the upper side in the image data when the front target object is near the driver's vehicle (see steps S104 and S105), the processing area is placed in an optimum position to be processed. This adjustment process also enhances the judgment accuracy.

(Correspondence of Steps to Components Used in Claims)

The processes Steps S101, S102, S103 to S106, and S107 to S113 are performed by the image processing device 10 and also functionally correspond to the image obtaining means, the position information obtaining means, the processing area determining means, and the judgment means, respectively, written in claims.

(Other Modifications)

The concept of the present invention is not limited by the embodiment described above. It is possible to have various modifications. For example, following modifications will be acceptable.

(Process of Setting the Size of the Processing Area)

In the embodiment according to the image processing device 10 previously described, the size of the processing area is increased according to increasing the strength of the reflected radar wave (or reflected wave). The present invention is not limited by this control. For example, it is possible to determine the size of the processing area according to the change of the strength of the reflected radar wave. In a concrete example, this control achieves the replacement of the process shown in FIG. 3 with following process shown in FIG. 10.

Figure 10:
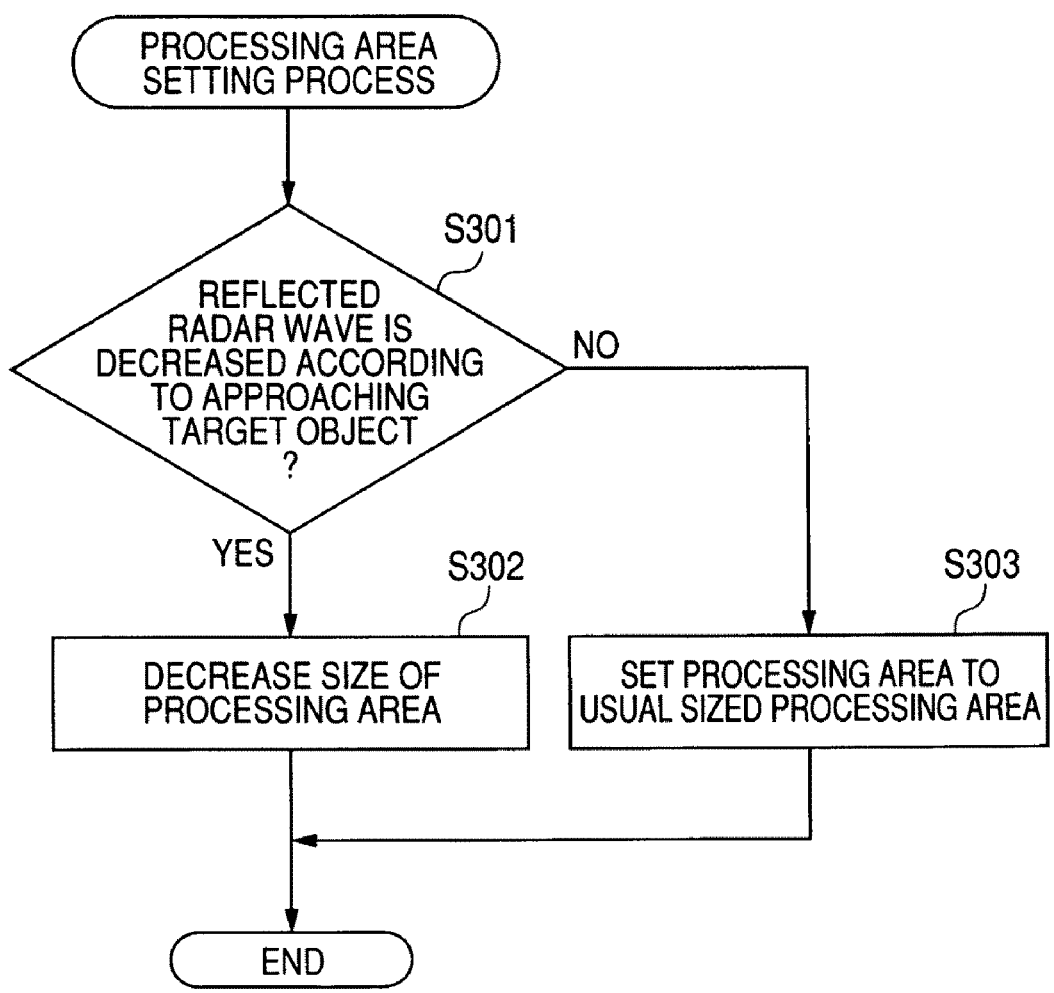
FIG. 10 is a flow chart showing a modification of the processing area setting process performed by the image processing device according to the embodiment of the present invention.

FIG. 10 is a flow chart showing a modification of the processing area setting process performed by the image processing device 10 according to the embodiment of the present invention.

When starting this process, the image processing device 10 detects or judges whether or not the strength of the reflected radar wave is gradually decreased according to approaching the front target object (step S301). This detection is performed using the difference between the average strength of the reflected radar waves of the past ten frames.

When the above detection result indicates the occurrence of decreasing the strength of the reflected radar wave ("YES" in step S301), the operation flow goes to step S302.

In step S302, the image processing device 10 sets the current processing area to a small sized area. In other words, the image processing device 10 decreases the size of the current processing area. The image processing device 10 then completes the processing area setting process shown in FIG. 10.

On the other hand, when the judgment result indicates the occurrence of not decreasing the strength of the reflected radar wave ("NO" in step S301), the operation flow goes to step S303. In step S303, the image processing device 10 sets the current processing area to an usual sized (or normal sized) processing area. The image processing device 10 then completes the processing area setting process shown in FIG. 10.

That is, the processing area setting process decreases the size of the processing area when the strength of the reflected radar waver tends to decrease. For example, when the front target object is a sign-board placed at the upper side on the road, the angle of the sign board to the driver's vehicle is gradually increased according to approaching the sign board (in other words, when the driver's vehicle approaches the sign board and the distance between the driver's vehicle and the sign board becomes gradually small), the angle of the driver's eyes to the sign board becomes gradually high and the intensity of the radar wave reflected by the sign board is gradually decreased. The image processing device 10 decreases the size of the processing area when the intensity of the reflected radar wave tends to decrease. This makes it possible to avoid that the sign board as the front target object is detected or judged as a three-dimensional object. As a result, it is thereby possible to increase the judgment accuracy.

It is also acceptable to expand (or shift) the processing area toward the upper side of the image data when the image processing device 10 judges that the front target object is a sign board.

(Process of Setting the Threshold Value)

In the embodiment according to the image processing device 10 previously described, the maximum threshold value and the average threshold value to the strength of the reflected radar waver are set using the maximum threshold value conversion map and the average threshold value conversion map shown in FIG. 8A and FIG. 8B. The present invention is not limited by this process. For example, it is possible to perform the process of setting the maximum threshold value and the average threshold value using the map shown in FIG. 11.

FIG. 11 is a flow chart showing a modification of the threshold value setting process in order to set the maximum threshold value and the average threshold value performed by the image processing device 10.

Firstly, when starting the process of setting the threshold value, the image processing device 10 sets the maximum threshold value to the value of 500 (step S401).

In step S402, the image processing device 10 sets the average threshold value to 70.

In step S403, the image processing device 10 judges whether or not the strength of the reflected radar wave is not less than the predetermined threshold value (for example, not less than −60).

When the judgment result indicates that the strength of the reflected radar wave is less than the predetermined value ("NO" in step S403), the operation flow goes to step S404.

In step S404, the image processing device 10 sets the maximum threshold value and the average threshold value to double values of them, respectively. The image processing device 10 then completes the threshold value setting process shown in FIG. 11.

On the other hand, when the judgment result indicates that the strength of the reflected radar wave is not less than the predetermined value ("YES" in step S403), The image processing device 10 completes the threshold value setting process shown in FIG. 11.

It is thereby possible for the image processing device 10 to set the maximum threshold value and the average threshold value by performing the process shown in FIG. 11 without using the threshold conversion maps shown in FIG. 8A and FIG. 8B.

(Adjustment of the Position of the Processing Area)

In the embodiment according to the present invention previously described, the image processing device 10 performs the adjustment process to shift the position of the processing area in the monitored image data by the predetermined compensation value only when the distance to the front object from the driver's vehicle is less than the predetermined threshold value. The concept of the present invention is not limited by this process. For example, the image processing device 10 analyses the monitored image data and detects the position of the tires of the target vehicle in the monitored image data, which is contacted onto the surface of the road, where the tires of the target vehicle is the rear tires of the target vehicle when the target vehicle is a front running vehicle in front of the driver's vehicle, and on the other hand, the tires of the target vehicle are the front tires of the target vehicle when the target vehicle is an oncoming vehicle. The image processing device 10 then adjusts the position of the processing area so that the bottom line of the processing area is set to the position of the tires of the target vehicle contacted to the surface of the road.

It is possible for the image processing device 10 to detect the position of the shadow of the target vehicle instead of detecting the position of the tires contacted to the surface of the road. The image processing device 10 then adjusts the position of the processing area based on the position of the shadow of the target vehicle.

(Radar)

The image processing device 10 according to the embodiment previously described uses the millimeter wave radar. The present invention is not limited by this. For example, it is possible to use the radar capable of irradiating a laser beam and an ultrasonic wave to the front target object to be detected.

(Other Features and Effects of the Present Invention)

In general, the monitored image data includes oblique edges such as white lines on a road. The presence of the oblique edges in the monitored image data may result in erroneous judgment. In order to avoid the error judgment, the image processing device as another aspect of the present invention provides the judgment means capable of determining or judging that the front target object is a three-dimensional object based on post-calculated vertical edge values obtained by subtracting horizontal edge values from vertical edge values in the image data of the processing area. The image processing device eliminates the vertical values in the oblique edges by the horizontal edge values in the oblique edges. This can avoid an error judgment of the image processing device caused by the vertical edge values in the oblique edges. By the way, when the image processing device detects a three-dimensional object based on the vertical edge values, it is preferred to judge the object of a relatively small width (or a horizontal length) such as a vehicle and a telegraph pole based on the maximum value in the vertical edge values (or vertical column edge value). On the other hand, it is preferred to detect the target object of a relatively large wide (or a horizontal length) and a complicated structure such as buildings and outdoor environments based on the average value of the vertical edge values (or vertical column edge value).

In the image processing device as another aspect of the present invention, the judgment means detects that the front target object is a three-dimensional object when at least one of following conditions (a) and (b) is satisfied:

(a) a maximum value is not less than a predetermined maximum threshold value, where the maximum value is the maximum value in vertical column edge values that is obtained by summing vertical edge values per each column in the image data in the processing area; and (b) an average value is not less than a predetermined average threshold value, where the average value is the average value of the vertical column edge values that is obtained by summing the vertical edge values per each column in the image data in the processing area. The image processing device having the above structure detects a three-dimensional object with high accuracy regardless of the types of the target objects.

In the image processing device as another aspect of the present invention, the position information obtaining means receives at least an intensity of the reflected wave, and the judgment means changes at least one of the predetermined maximum threshold value and the predetermined average threshold value according to the intensity of the reflected wave. For example, because a high intensity of the reflected wave (such as a radar wave reflected by the front target object) has a high possibility of being a vehicle, the judgment means changes the threshold value to a low threshold value. This control provides the easy judgment to detect a three-dimensional object.

In the image processing device as another aspect of the present invention, the position information obtaining means receives at least an intensity of the reflected wave, and the processing area determining means changes and determines the size of the processing area according to the intensity of the reflected wave. The image processing device according to the present invention can increase the judgment accuracy by changing the size of the processing area to an optimum size. For example, because a strong intensity of the reflected wave has a high possibility of being a large vehicle (such as a truck), the judgment means changes the size of the processing area to a large size in order to certainly include the target object in the processing area. On the other hand, when the strength of the reflected wave tends to be decreased according to the driver's vehicle approaches the target object, because the target object has a high possibility of being a sign board placed at the upper side on the road, the judgment means changes the size of the processing area to a small size. This makes it possible to avoid a wrong judgment that the sign board as the target object is a three-dimensional object.

In the image processing device as another aspect of the present invention, the processing area determining means adjusts a position of the processing area in the monitored image data according to a distance from the driver's vehicle to the front target object based on the position information.

The image processing device can increase the judgment accuracy by adjusting and setting the position of the processing area in the monitored image data to an optimum position. For example, when the front target object is a vehicle, because the position of the bottom side of the vehicle is higher in position than the surface of the road (above the surface of the road), the more the driver's vehicle approaches the front target vehicle, the more the difference in position between the front vehicle and the driver's vehicle in the monitored image data is increased. This problem can be avoid by performing the adjustment to shift the processing area in the monitored image data toward the upper side in order to completely and certainly include the front target vehicle in the processing area. This adjustment is adequately effective for the case where the front target vehicle is an oncoming vehicle.

In the image processing device as another aspect of the present invention, when the front target object is a vehicle as a target object to be judged, the processing area determining means shifts the position of the processing area toward an upper side in the monitored image data so that the distance between the driver's vehicle and the target vehicle is changed from a distance between the driver's vehicle and the front part of the target vehicle to a distance between the driver's vehicle and the tires of the target vehicle at the driver's vehicle side. The image processing device according to the present invention can increase the judgment accuracy by adjusting and setting the position of the processing area in the monitored image data to an optimum position. For example, when the front target object is a vehicle (a front vehicle, or an oncoming vehicle), the position of the bottom side of the rear of the front vehicle or the position of the bottom side of the front of the on-coming vehicle is higher in position than the surface of the road. In this case, when the processing area is determined based on the distance between the driver's vehicle and the position of the front target vehicle (the front running vehicle or the oncoming vehicle), the processing area includes the space area between the surface of the road and the front target vehicle, and as a result, the ratio of the vehicle (as the target to detect edges) to the processing area becomes a small size (or zero). In order to avoid this problem, the judgment means in the image processing device according to the present invention adjust the processing area, to be shifted toward the upper side in the monitored image data, in order to replace the distance between the driver's vehicle and the front target vehicle (ahead of the driver's vehicle) with the distance between the driver's vehicle and the position of the tires of the front target vehicle contacted to the surface of the road, where the position of the tires of the target vehicle is the rear tires when the front target vehicle is a front running vehicle in front of the driver's vehicle, and the position of the tires of the target vehicle is the front tires when the front target vehicle is an oncoming vehicle. This reliably enables the processing area to include the front side of the front target vehicle.

In accordance with another aspect of the present invention, there is provided a three-dimensional object detection method. The method has following steps (st1 to st4), (st1) a step of receiving monitored image data of front objects that exist in front of a driver's vehicle, (st2) a step of receiving position information of the front objects that are obtained from a radar wave (or a wave for short) transmitted to the front area in front of the driver's vehicle and reflected by the front objects, (st3) a step of determining a processing area including a front target object in the front objects in the monitored image data based on the position information, and (st4) a step of judging whether or not the front target object is a three-dimensional object based on edges detected in the image data in the determined processing area.

The method according to the present invention has the same effects of the image processing device according to the present invention previously described.

In accordance with another aspect of the present invention, there is provided a program for performing an image processing. The program has following functions p1 to p4:

(p1) a function of an image obtaining means configured to receive monitored image data of front objects that exist in front of a driver's vehicle;

(p2) a function of a position information obtaining means configured to receive position information of the front objects that are obtained from a wave transmitted to the front area in front of the driver's vehicle, and reflected by the front objects;

(p3) a processing area determining means configured to determine a processing area including a front target object in the front objects in the monitored image data based on the position information; and (p4) an judgment means configured to determine or judge whether or not the front target object is a three-dimensional object based on edges detected in the image data in the processing area determined by the processing area determining means.

The program according to the present invention has the same effects of the image processing device and the method according to the present invention previously described.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An image processing device for a driver's vehicle comprising:

means for receiving monitored image data of front objects that exist in front of the driver's vehicle;

means for receiving position information of the front objects which are obtained from a wave transmitted toward the front area in front of the driver's vehicle and reflected by the front objects;

means for determining a processing area including a front target object in the front objects in the monitored image data based on the position information; and means for judging whether or not the front target object is a three-dimensional object based on edges detected in the image data in the processing area determined by the determining means, wherein the judging means judges the front target object is a three-dimensional object when at least one of following conditions (a) and (b) is satisfied:

(a) a maximum value is not less than a predetermined maximum threshold value, where the maximum value is the maximum value in vertical column edge values that is obtained by summing vertical edge values per each column in the image data in the processing area; and (b) an average value is not less than a predetermined average threshold value, where the average value is the average value of the vertical column edge values that is obtained by summing the vertical edge values per each column in the image data in the processing area.

2. The image processing device according to claim 1, wherein the means for receiving position information receives at least an intensity of the reflected wave, and the judging means changes at least one of the predetermined maximum threshold value and the predetermined average threshold value according to the intensity of the reflected wave.

3. The image processing device according to claim 2, wherein the determining means adjusts a position of the processing area in the monitored image data according to a distance from the driver's vehicle to the front target object based on the position information.

4. The image processing device according to claim 2, wherein when the front target object is a target vehicle to be detected, the determining means shifts the position of the processing area toward an upper side in the monitored image data so that the distance between the driver's vehicle and the target vehicle is changed from a distance between the driver's vehicle and the front part of the target vehicle to a distance between the driver's vehicle and the tires of the target vehicle at the driver's vehicle side.

5. The image processing device according to claim 1, wherein the determining means adjusts a position of the processing area in the monitored image data according to a distance from the driver's vehicle to the front target object based on the position information.

6. The image processing device according to claim 1, wherein when the front target object is a target vehicle to be detected, the determining means shifts the position of the processing area toward an upper side in the monitored image data so that the distance between the driver's vehicle and the target vehicle is changed from a distance between the driver's vehicle and the front part of the target vehicle to a distance between the driver's vehicle and the tires of the target vehicle at the driver's vehicle side.

7. The image processing device according to claim 1, wherein the judging means judges the front target object is a three-dimensional object based on post-calculated vertical edge values obtained by subtracting horizontal edge values from vertical edge values in the image data of the processing area.

8. The image processing device according to claim 1, wherein the means for receiving the information receives at least an intensity of the reflected wave, and the determining means changes the size of the processing area according to the intensity of the reflected wave.

9. An image processing device for a driver's vehicle comprising:

means for receiving monitored image data of front objects that exist in front of the driver's vehicle;

means for receiving position information of the front objects that are obtained from a wave transmitted toward the front area in front of the driver's vehicle and reflected by the front objects;

means for determining a processing area including a front target object in the front objects in the monitored image data based on the position information; and means for judging whether or not the front target object is a three-dimensional object based on edges detected in the image data in the processing area determined by the determining means, wherein when the front target object is a target vehicle to be detected, the determining means shifts the position of the processing area toward an upper side in the monitored image data so that the distance between the driver's vehicle and the target vehicle is changed from a distance between the driver's vehicle and the front part of the target vehicle to a distance between the driver's vehicle and the tires of the target vehicle at the driver's vehicle side.

10. The image processing device according to claim 9, wherein the judging means judges the front target object is a three-dimensional object based on post-calculated vertical edge values obtained by subtracting horizontal edge values from vertical edge values in the image data of the processing area.

11. The image processing device according to claim 9, wherein the means for receiving the information receives at least an intensity of the reflected wave, and the determining means changes the size of the processing area according to the intensity of the reflected wave.

* * * * *